United States Patent
Jimenez Haertel et al.

(10) Patent No.: US 7,832,192 B2
(45) Date of Patent: Nov. 16, 2010

(54) METHOD FOR INJECTING A LIQUID MIST INTO AN INTAKE DUCT

(75) Inventors: Carlos Jimenez Haertel, Munich (DE); Stefan Oesterle, Turgi (CH); Carsten Reumschuessel, Grenzach-Wyhlen (DE); Sasha Savic, Wettingen (CH)

(73) Assignee: Alstom Technology Ltd, Baden (CH)

(*) Notice: Subject to any disclaimer, the term of this patent is extended or adjusted under 35 U.S.C. 154(b) by 1295 days.

(21) Appl. No.: 11/364,536

(22) Filed: Mar. 1, 2006

(65) Prior Publication Data

US 2006/0218931 A1  Oct. 5, 2006

Related U.S. Application Data

(63) Continuation of application No. PCT/EP2004/051928, filed on Aug. 26, 2004.

(30) Foreign Application Priority Data

Sep. 1, 2003 (DE) .................. 103 40 177

(51) Int. Cl.
*F02C 9/00* (2006.01)
(52) U.S. Cl. .................. 60/39.3; 60/39.53
(58) Field of Classification Search .............. 60/39.53, 60/39.59, 728, 775, 39.3
See application file for complete search history.

(56) References Cited

U.S. PATENT DOCUMENTS

| | | | | |
|---|---|---|---|---|
| 4,682,471 A | * | 7/1987 | Wagner | ............... 60/649 |
| 5,580,221 A | * | 12/1996 | Triezenberg | ............... 417/44.2 |
| 6,045,332 A | | 4/2000 | Lee et al. | |
| 6,470,667 B1 | | 10/2002 | Payling et al. | |
| 6,478,289 B1 | * | 11/2002 | Trewin | ............... 261/27 |
| 6,634,165 B2 | * | 10/2003 | Tomlinson et al. | ............... 60/39.3 |
| 2002/0083712 A1 | | 7/2002 | Tomlinson et al. | |
| 2002/0106292 A1 | | 8/2002 | Chowaniec et al. | |
| 2004/0255596 A1 | * | 12/2004 | Horii et al. | ............... 60/775 |
| 2005/0034463 A1 | * | 2/2005 | Simpson et al. | ............... 60/775 |

FOREIGN PATENT DOCUMENTS

| | | |
|---|---|---|
| DE | 25 49 790 A1 | 5/1977 |
| DE | 102 56 193 A1 | 6/2004 |
| EP | 0 898 645 B1 | 3/1999 |
| EP | 1 203 866 A2 | 5/2002 |
| FR | 1.563.749 | 3/1969 |
| WO | 03/089777 A1 | 10/2003 |

OTHER PUBLICATIONS

International Search Report dated Mar. 24, 2005.
Form PCT/ISA/237 (Written Opinion of the International Searching Authority) dated Jul. 1, 2005.

* cited by examiner

*Primary Examiner*—Michael Cuff
*Assistant Examiner*—Phutthiwat Wongwian
(74) *Attorney, Agent, or Firm*—Buchanan Ingersoll & Rooney PC

(57) ABSTRACT

A system for the atomization of liquid is arranged on the intake duct of a gas turbo set. This atomization system comprises a number of nozzle tubes with atomizer nozzles, switching valves for selective action upon the nozzle tubes by liquid and a pump for conveying the liquid to be atomized. According to the invention, the pump is connected to a variable-speed drive. The switching valves are preferably designed as proportional valves. In a corresponding regulating circuit, this makes it possible to limit pressure gradients in the atomization system and consequently to avoid hammers.

16 Claims, 4 Drawing Sheets

METHOD FOR INJECTING A LIQUID MIST INTO AN INTAKE DUCT

RELATED APPLICATION

This application claims priority under 35 U.S.C. §119 to German Application No. 103 40 177.6 filed in Germany on Sep. 1, 2003, and as a continuation application under 35 U.S.C. §120 to PCT/EP2004/051928 filed as an International Application on Aug. 26, 2004, designating the U.S., the entire contents of which are hereby incorporated by reference.

BACKGROUND INFORMATION

The injection of liquid into the intake duct of air-breathing thermal engines is known in the prior art as a means of increasing the power. In FR 1,563,749, DE 25 49 790 or EP 898645, it was proposed, for example, to inject liquid water droplets into a compressor of a gas turbo set.

Often, in this case, injection systems are used in which switching valves switch on nozzles or nozzle groups or in which the throughflow is controlled by valves, the characteristic curve of which deviates sharply from the linearity of the throughflow behavior against the valve position. This is the case, for example, in ball valves, the valve characteristic curve of which is highly nonlinear. Switching operations of this type lead to hammers in the injection systems and associated pipeline systems which may put the integrity of the system at risk and/or which require corresponding overdimensioning.

SUMMARY

It is therefore an object of the present invention to provide for a system and a method which can avoid the disadvantages of the prior art.

An exemplary atomization and injection system has a pump with a variable-speed drive for conveying the liquid to be atomized. This pump is operated with a limited rotational speed/time gradient. The rotational speed/time gradient may, on the one hand, be predetermined permanently in a rotational speed control of the pump. In a further type of operation according to the invention, the rotational speed/time gradient of the pump is limited to a predetermined upper limit value. In an exemplary embodiment, at least one pressure and/or one mass flow downstream of the pump is measured, and a control of the pump rotational speed takes place, with the measured pressure and/or mass flow as the control variable.

In one exemplary embodiment of the invention, the atomization and injection system is provided with throttle and/or shutoff members which are designed as proportional valves with an essentially linear profile of the liquid mass flow characteristic curve against the valve position.

These serve, in particular, for the controlled action upon injection and atomizer nozzles and/or nozzle groups by the liquid conveyed by the pump. For example, when it is opened from a completely closed state, a ball valve, in a first phase, allows virtually no mass flow to flow through it, but, in other regions of the opening characteristic curve, has a very high dependence of the mass flow on the valve position. This inhomogeneous characteristic curve of the mass flow against time is a substantial cause of hammers in the system. By contrast, the proportional valves to be used according to the invention have, essentially over the entire opening range, an as far as possible uniform linear dependence of the liquid throughflow on the valve position. This allows a uniform and continuous control of the mass flow passed through the injection and/or atomizer nozzles, with the result that hammers are avoided. In a preferred type of operation, the adjustment of the valve position takes place with a predetermined valve position/time gradient. In another preferred type of operation, the valve position/time gradient is limited to a maximum value.

In a further advantageous type of operation of the system according to the invention a first pressure measurement value is measured downstream of the pump and upstream of a valve. The first pressure measurement value is used as a control variable for regulating the pump. In this case, in one embodiment, the rotational speed of the pump is regulated so as to keep the pressure constant. In another embodiment, the pump rotational speed is regulated in such a way as to result in a predetermined pressure/time gradient of the first pressure measurement value. Pressure regulation, with the pump rotational speed as the controlling variable, can basically take place in that, in the case of a positive actual value/desired value difference of the pressure measurement value, the pump rotational speed is reduced, and, conversely, if the measured actual value lies below the desired value, the pump rotational speed is increased. Advantageously, a second pressure is additionally measured downstream of a proportional valve, and the position of the valve is varied in such a way that a maximum time gradient of the second pressure measurement value remains reliably undershot. In this case, presupposing a constant liquid admission pressure, it is to be presumed that the second pressure measurement value rises during the opening of the valve and falls during the closing of the valve, so that a person skilled in the art is also given sufficient technical teaching as to how the invention is to be implemented. In one embodiment, therefore, in the case of a constant admission pressure, the valve is initially adjusted with a predetermined gradient of the valve position. In this case, the pressure downstream of the valve is measured continuously. If the pressure varies more quickly than is at most permissible, the rate of the valve adjustment is reduced, with the result that the rate of pressure variation is again set at a permissible value. In a further operating variant, to control the valve, the first pressure measurement value is additionally also evaluated.

In another exemplary embodiment of the invention, a mass flow measurement point for measuring the mass flow conveyed by the pump is arranged. Preferably, the mass flow measured there is then used as a control variable for regulating the pump rotational speed, the pressure gradient also being evaluated within the pump controller in order to control the pump rotational speed such that the amount of the pressure gradient does not overshoot a maximum value.

In this case, it is to be presumed, in general, that, in the case of constant pressures upstream and downstream of the pump, the mass flow rises with a rising rotational speed. Furthermore, with the mass flow remaining the same, the pressure downstream of the pump rises with the rotational speed. It is presumed, moreover, that a person skilled in the art is familiar with the general fundamentals of pump characteristic maps in which the pressure is plotted against the mass flow for various rotational speeds. The ratio of pressure and mass flow is determined by the throughflow characteristic of the components arranged downstream of the pump.

DESCRIPTION OF THE DRAWINGS

Details of the method for injecting a liquid mist into an intake duct my be learned from the exemplary embodiments illustrated in the drawing, wherein:

FIG. 1 shows a gas turbo set with an atomization and injection system according to the invention;

FIG. 2 shows exemplary valve characteristic curves of a ball valve and of a proportional valve;

DETAILED DESCRIPTION

Elements not directly necessary for understanding the invention are omitted. The exemplary embodiments are to be understood purely instructively and are not to be called upon in order to restrict the invention characterized in the claims.

Figure 1:
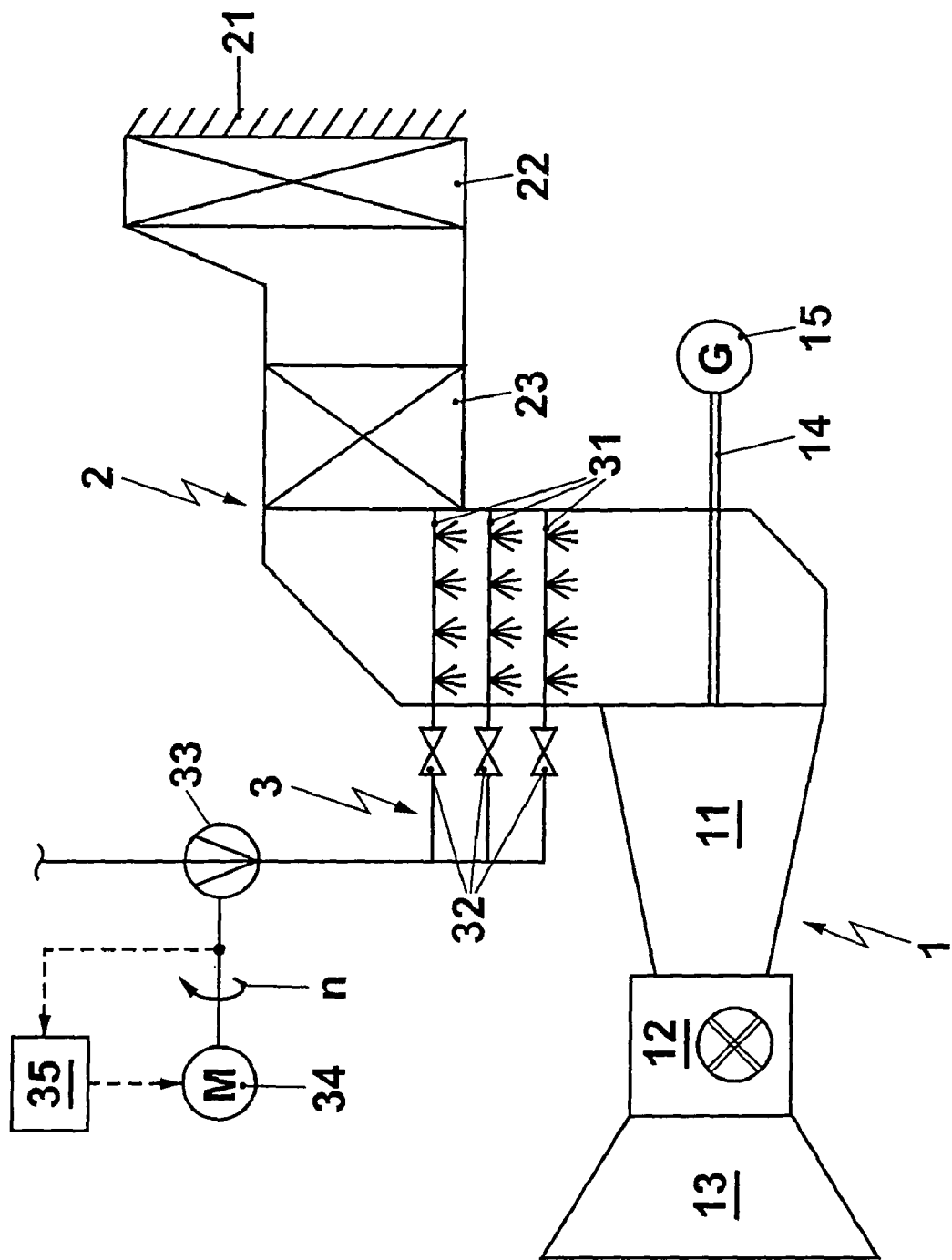

FIG. 1 illustrates a gas turbo set 1 comprising a compressor 11, a combustion chamber 12 and a turbine 13. The gas turbo set drives a generator 15 via a shaft 14. An air intake duct 2 is arranged upstream of the compressor 11. At the air inlet of this duct are arranged weather protection slats 21, followed by an air filter 22 and by a muffler 23. Furthermore, an atomization and injection system 3 for a liquid to be sprayed as a liquid mist into the intake duct is arranged. This comprises nozzle tubes 31 which are arranged in the intake duct 2 and carry atomizer nozzles. The nozzle tubes 31 are provided with injection nozzles, not explicitly illustrated but readily familiar to a person skilled in the art, and serve for feeding the latter. In this case, of course, the invention is in no way restricted to three nozzle tubes. The liquid at the liquid pressure necessary for atomization is conveyed by the pump 33 and is supplied to the individual nozzle tubes via shutoff and/or throttle members 32. The shutoff and/or throttle members serve for activating nozzles and/or nozzle groups. The pump 33 is driven by a motor 34; this, in turn, is activated by a control apparatus 35 in such a way that a variable-speed drive is available for the pump 33. The variable-speed drive of the pump makes it possible to implement changes in rotational speed and in power of the pump in a controlled or regulated way with limited gradients and therefore without hammers.

Figure 2:
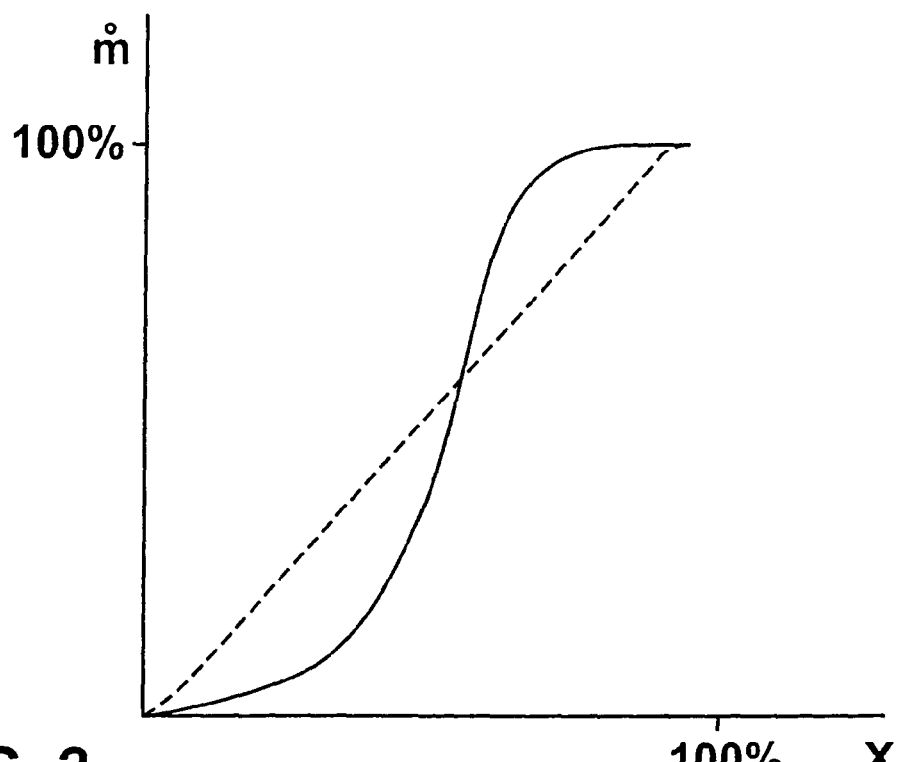

In one exemplary embodiment of the invention, to put the atomization and injection system into operation, some of the valves 32 are opened, and then the pump 33 is started up slowly. In this case, the start-up rate is affected by means of the rotational speed control 35 so slowly that hammers in the line system of the atomization and injection system are avoided. In an advantageous embodiment of the invention, the valves 32 are proportional valves, with an as far as possible linear profile of the mass flow against the valve position. The proportional valves make it possible in a simple way, for example, to switch on further nozzle groups or to switch these off continuously with limited gradients. Consequently, on the one hand, hammers in the nozzle tubes 31 are avoided, and an overload of the control 35 of the pump 33 due to excessive mass flow gradients is avoided. In FIG. 2, exemplary valve characteristic curves of a proportional valve and of a ball valve are compared. The ball valve, on solid line, has a highly nonlinear characteristic curve. It is consequently difficult to activate, because the transmission behavior with which a variation in the valve position X is converted into a change in the mass flow $\dot{m}$ is dependent to a high degree on the valve position. A continuous "jolt-free" and stable mass flow control therefore requires a progressive knowledge of the valve position and of the valve characteristic curve. In the case of a proportional valve, illustrated by dashes, by contrast, the mass flow/valve position characteristic curve is linear over wide regions, so that the transmission behavior, when integrated into a closed loop or into a control, is a constant. It is therefore always identical which mass flow change $\Delta\dot{m}$ entails a change in the valve position $\Delta X$, and therefore a proportional valve can be integrated into a control or regulation in a substantially simpler way, without feedback of the valve position and with a foreseeable transmission behavior.

Figure 3:
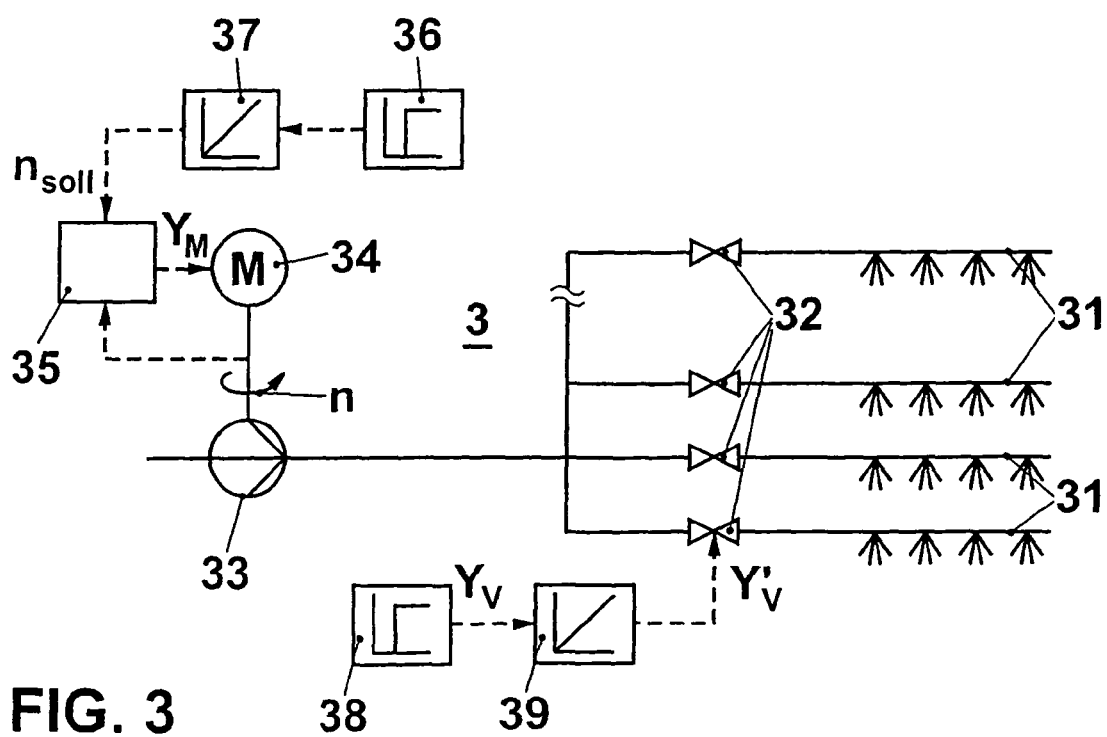
FIG. 3 shows a first embodiment of the invention.

An exemplary embodiment of the invention is illustrated in FIG. 3. The atomization and injection system 3 is substantially identical to that described in FIG. 1. The motor 34 for driving the pump 33 is of variable speed. For this purpose, on the one hand, a desired value $n_{DES}$ is predetermined in a rotational speed controller 35. This is compared with a measured actual value n of the rotational speed of the drive shaft. The controller, from the control deviation, forms a control variable $Y_M$ for the motor 34, and the actual rotational speed is thus set to the desired value by means of the controller 35. The rotational speed desired value is predetermined by a function block 36. The predetermined value is supplied to the controller 35 via a delay element 37 which converts an abrupt change in the predetermined value into a ramp function with a limited gradient, in such a way that the rotational speed desired value present to the controller 35 rises with a limited time gradient. A discontinuous controlling variable $Y_V$, predetermined by a function block 38, for a valve 32 is likewise converted in a delay element 39 into a continuously rising ramp function of the valve control variable $Y'_V$, in such a way that the valve position is only varied at a limited rate. These measures, and, in particular, their combination, avoid discontinuities in the throughflow in the pipeline system, with the result that potentially harmful hammers are avoided.

Figure 4:
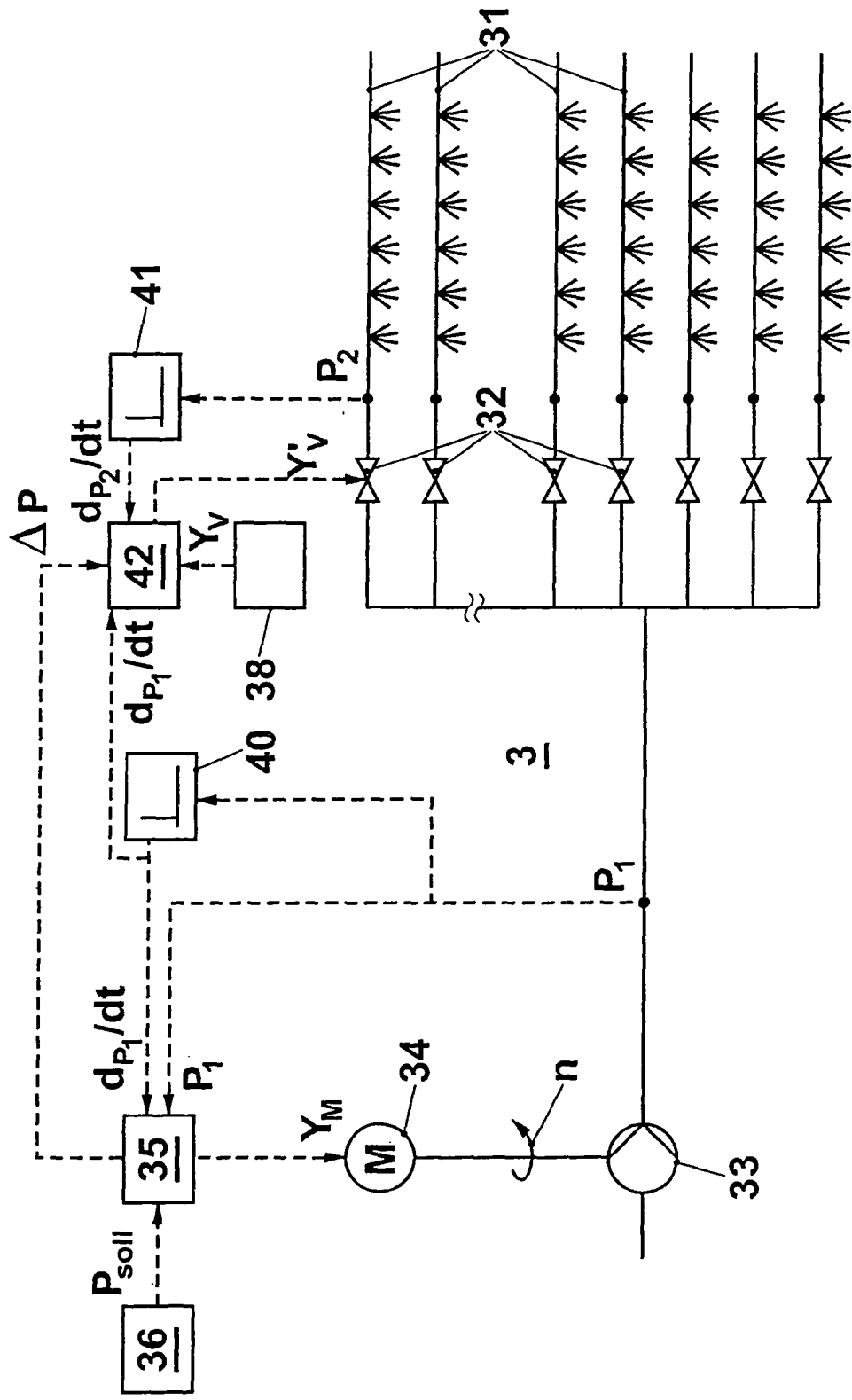
FIGS. 4 and 5 show further embodiments of the invention.

Another exemplary embodiment of the invention is illustrated in FIG. 4. A first pressure measurement point is arranged downstream of the pump 33 and upstream of the valves 32, proportional valves preferably being used. The pressure measurement point delivers a pressure measurement value $p_1$ to the controller 35. The desired value generator 36 delivers a desired value of the pressure $p_{DES}$ to the controller 35. The controller 35, from the desired-value-actual-value deviation, forms the control variable $Y_M$ for controlling the motor 34 for the pump drive. If the measured pressure is lower than the desired value, the rotational speed n is increased and, conversely, reduced. Furthermore, the pressure measurement signal $p_1$ is conducted to a differentiator 40 which determines the pressure gradient $dp_1/dt$. This is likewise evaluated in the controller 35 and limited to a maximum value in terms of amount. If the amount of the gradient is greater than the permissible maximum value, the rate of adjustment of the pump rotational speed is adapted correspondingly, so that the amount of the gradient is set below the permissible maximum value. Furthermore, a second pressure $p_2$ is measured by means of a pressure measurement point arranged downstream of a valve. A differentiator 41 forms the pressure gradient $dp_2/dt$. A function block 38 outputs actuating commands $Y_V$ for the valve 32. However, an actuating command is not transferred directly to the valve 32, but is first processed in a controller 42. An adjustment of the valve 32, of course, entails a pressure gradient $dp_2/dt$. This pressure gradient is evaluated in the controller 42 and the control command $Y_V$ is transferred as a delayed control command $Y'_V$ to the valve 32. Furthermore, an adjustment of the valve 32 also entails a variation in the flow conditions and pressure conditions prevailing upstream, so that the pump regulation described above must become active. As is easily evident to a person skilled in the art, without the pump being regulated, an opening of a valve leads to a fall of the first pressure and a closing leads to a rise of the first pressure. Preferably, therefore, the first pressure measurement value is also taken into account in the controller 42. Thus, advantageously, the first pressure gradient $dp_1/dt$ and the control deviation of the first pressure $\Delta p$ are led as input variables to the controller 42. The rate of adjustment of the valve is further reduced, if appropriate, when the gradient or control deviation of the first pressure reaches or overshoots a permissible maximum value in terms of amount. This avoids the situation where too much is expected of the regulating rate of the pump regulation.

Figure 5:
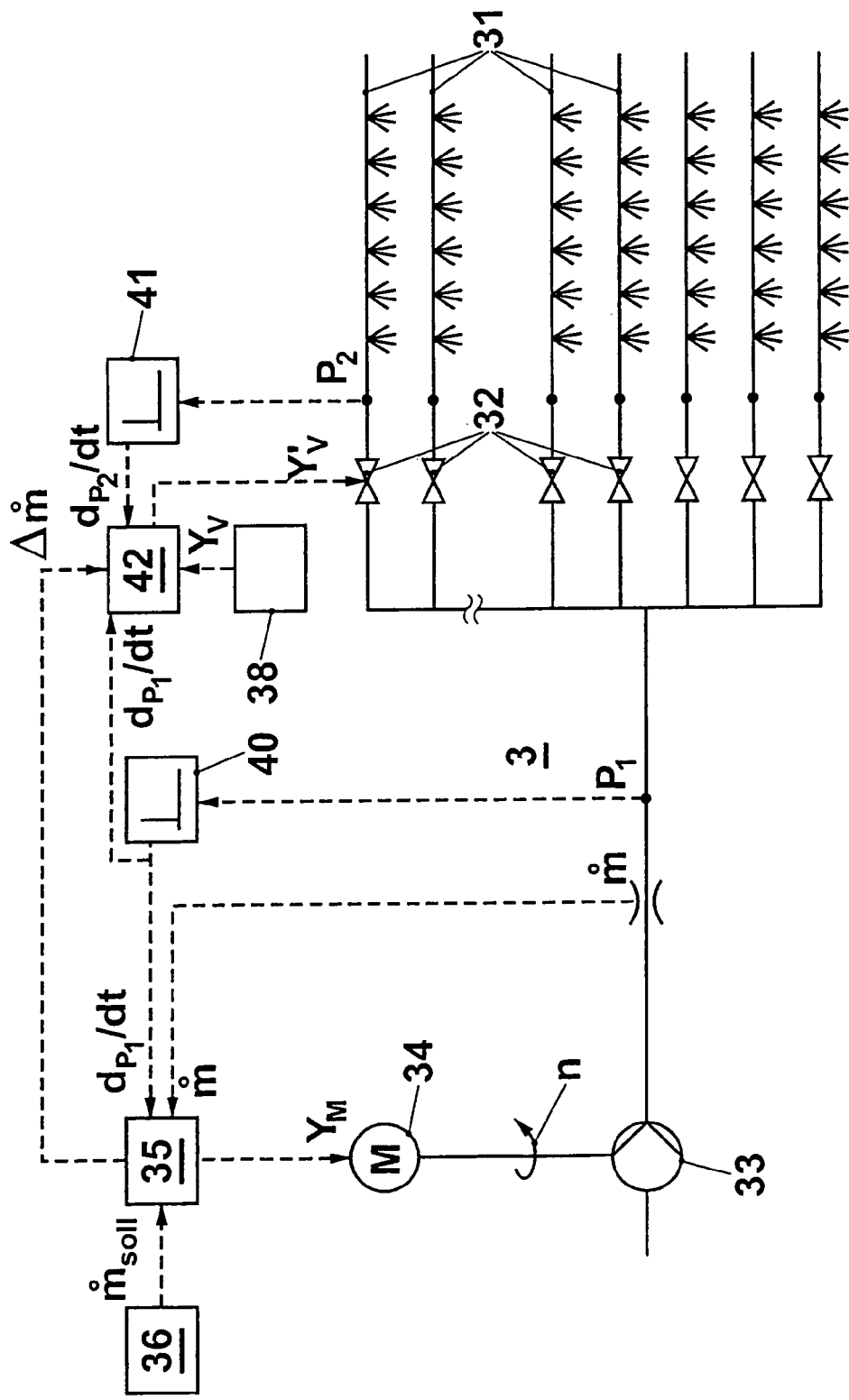

Yet another exemplary embodiment is illustrated in FIG. 5. This differs from that described in connection with FIG. 4 in the additional arrangement of a mass flow measurement point for measuring the mass flow ṁ conveyed by the pump 33. The desired value generator 36 delivers a mass flow desired value ṁ$_{des}$ to the pump controller 35. The latter regulates the pump rotational speed in such a way that the actual mass flow ṁ is set at the desired mass flow ṁ$_{DES}$. In this case, again, the first pressure gradient dp$_1$/dt is evaluated. Regulation is in this case carried out in the way described above in such a way that the amount of the first pressure gradient is held below a permissible maximum value. Preferably, the mass flow desired value signal also has a gradient which is limited in terms of amount. The position of the valve 32 is regulated essentially in the way described above.

The examples described above reveal to a person skilled in the art examples of the many different possibilities which the atomization and injection system characterized in the claims offer to him for the avoidance of hammers in the pipe system.

The exemplary methods and devices of the present invention have been described and illustrated in various exemplary configurations. However, guided by the teachings of the invention, persons of ordinary skill in the art will be able to realize further embodiments. The disclosed exemplary methods could have further features and capabilities and perform functions in addition to those that are expressly described and claimed. Such variations are also within the scope of the present disclosure

The invention claimed is:

1. A method for injecting a liquid mist into an intake duct of a gas turbine engine, the method comprising:
   arranging at least one valve downstream of a pump to regulate liquid conveyed by the pump to nozzles and/or nozzle groups within the intake duct, the pump having a variable-speed drive;
   carrying out variations in a rotational speed (n) of the pump with a predetermined amount of a rotational speed/time gradient;
   measuring a first pressure downstream of the pump and upstream of the at least one valve; and
   regulating the rotational speed of the pump so as to keep the first pressure constant.

2. The method as claimed in claim 1, wherein the at least one valve is at least one proportional valve, comprising:
   regulating the at least proportional valve with a linear profile of a liquid mass flow characteristic curve against a position of the at least one valve.

3. The method as claimed in claim 2, wherein a number of the nozzles are combined into a nozzle group and wherein activation of at least one nozzle group takes place via the at lest one proportional valve.

4. The method as claimed in claim 2, wherein the valve regulating takes place with a predetermined amount of a valve position/time gradient.

5. The method as claimed in claim 1, wherein the at least one valve is at least one throttle and/or shut off member.

6. A method for injecting a liquid mist into an intake duct of a gas turbine engine, the method comprising:
   arranging at least one valve downstream of a pump to regulate liquid conveyed by the pump to nozzles and/or nozzle groups within the intake duct, the pump having a variable-speed drive;
   carrying out variations in a rotational speed (n) of the pump with a predetermined amount of a rotational speed/time gradient;
   measuring a first pressure downstream of the pump and upstream of the at least one valve;
   regulating the rotational speed of the pump so as to keep the first pressure constant; and
   regulating a rate of adjustment of the pump rotational speed so that a maximum permissible amount of a pressure gradient remains undershot.

7. The method as claimed in claim 6, comprising:
   measuring a second pressure downstream of the at least one valve; and
   varying a position of the at least one valve so that a maximum amount of a pressure/time gradient of the second pressure measurement value remains reliably undershot.

8. The method as claimed in claim 7, comprising:
   limiting a rate of variation in the at least one valve position when a maximum permissible amount of the gradient of a first pressure measurement value is reached.

9. The method as claimed in claim 6, wherein the at least one valve is at least one proportional valve comprising:
   regulating the at least one proportional valve with a linear profile of a liquid mass flow characteristic curve against a position of the at least one valve.

10. The method as claimed in claim 9, wherein a number of the nozzles are combined into a nozzle group and wherein activation of at least one nozzle group takes place via the at least one proportional valve.

11. The method as claimed in claim 9, wherein the valve regulating takes place with a predetermined amount of a valve position/time gradient.

12. A method for injecting a liquid mist into an intake duct of a gas turbine engine, the method comprising:
   arranging at least one valve downstream of a pump to regulate liquid conveyed by the pump to nozzles and/or nozzle groups within the intake duct, the pump having a variable-speed drive;
   carrying out variations in a rotational speed (n) of the pump with a predetermined amount of a rotational speed/time gradient;
   measuring mass flow conveyed by the pump;
   regulating the rotational speed of the pump using the mass flow as a controlled variable so that the measured mass flow corresponds to a desired mass flow;
   measuring a first pressure downstream of the pump and upstream of the at least one valve;
   determining a gradient of the first pressure; and
   regulating a rate of adjustment of the pump rotational speed so that a maximum permissible amount of the pressure gradient remains undershot.

13. The method as claimed in claim 12, comprising:
   measuring a second pressure downstream of the at least one valve; and
   varying the position of the at least one valve so that a maximum amount of a pressure/time gradient of the second pressure measurement value remains reliably undershot.

14. The method as claimed in claim 12, wherein the at least one valve is a proportional valve comprising:
   regulating the at least one proportional valve with a linear profile of a liquid mass flow characteristic curve against a position of the at least one valve.

15. The method as claimed in claim 14, wherein a number of the nozzles are combined into a nozzle group and wherein activation of at least one nozzle group takes place via the at least one proportional valve.

16. The method as claimed in claim 14, wherein the valve regulating takes place with a predetermined amount of a valve position/time gradient.

* * * * *